United States Patent
Nakagawa et al.

(10) Patent No.: US 9,071,108 B2
(45) Date of Patent: Jun. 30, 2015

(54) MOVABLE IRON CORE LINEAR ACTUATOR

(75) Inventors: Hiroshi Nakagawa, Mie (JP); Takayoshi Fujii, Mie (JP); Takashi Fukunaga, Mie (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 269 days.

(21) Appl. No.: 13/809,351

(22) PCT Filed: Jul. 11, 2011

(86) PCT No.: PCT/JP2011/065810
§ 371 (c)(1),
(2), (4) Date: Jan. 9, 2013

(87) PCT Pub. No.: WO2012/008418
PCT Pub. Date: Jan. 19, 2012

(65) Prior Publication Data
US 2013/0119788 A1 May 16, 2013

(30) Foreign Application Priority Data
Jul. 12, 2010 (JP) .................. 2010-157507

(51) Int. Cl.
H02K 33/00 (2006.01)
H02K 1/34 (2006.01)
H02K 33/16 (2006.01)

(52) U.S. Cl.
CPC . *H02K 1/34* (2013.01); *H02K 33/16* (2013.01)

(58) Field of Classification Search
CPC .................................. H02K 1/34; H02K 33/16
USPC ...................... 310/12.24, 12.26, 25
See application file for complete search history.

(56) References Cited

U.S. PATENT DOCUMENTS 4,785,210 A * 11/1988 Maruyama et al. ........ 310/12.04
5,208,498 A    5/1993 Hamajima
(Continued)

FOREIGN PATENT DOCUMENTS

JP    2002-078252 A    3/2002
JP    2004-360747 A    12/2004
(Continued)

OTHER PUBLICATIONS

International Search Report of PCT/JP2011/065810, mailing date of Sep. 27, 2011.
(Continued)

*Primary Examiner* — Hanh Nguyen
(74) *Attorney, Agent, or Firm* — Westerman, Hattori, Daniels & Adrian, LLP

(57) ABSTRACT

There is provided a movable iron core linear actuator, which includes a magnetic circuit which causes a moving element to reciprocate. The magnetic circuit includes an iron core constituting the moving element, a stator core including a facing portion which faces the iron core, a pair of permanent magnets disposed in the facing portion along a reciprocating direction and having inverted magnetic poles at their surfaces which face the iron core, and a coil wound around the stator core. Energization to coil causes the moving element to reciprocate. When the coil is energized, the spring force of magnetic spring which changed in accordance with a relative position of the moving element with respect to the stator core is superimposed on the electromagnetic driving force produced by the energization of the coil and is applied to the moving element by the magnetic flux produced by the permanent magnets.

16 Claims, 10 Drawing Sheets

(56) References Cited

U.S. PATENT DOCUMENTS

| | | | |
|---|---|---|---|
| 5,896,076 A | * | 4/1999 | van Namen .................. 335/229 |
| 2010/0127580 A1 | * | 5/2010 | Schrader .................. 310/12.26 |

FOREIGN PATENT DOCUMENTS

| | | |
|---|---|---|
| JP | 2005-328655 A | 11/2005 |
| JP | 2006-014464 A | 1/2006 |
| JP | 2007-135351 A | 5/2007 |
| WO | 2009/081295 A2 | 7/2009 |
| WO | 2010/047377 A1 | 4/2010 |

OTHER PUBLICATIONS

Chinese Office Action dated Aug. 22, 2014, issued in corresponding Chinese Patent Application No. 201180034488.4, (9 pages).

* cited by examiner

Fig. 3
(a) NOT ENERGIZED
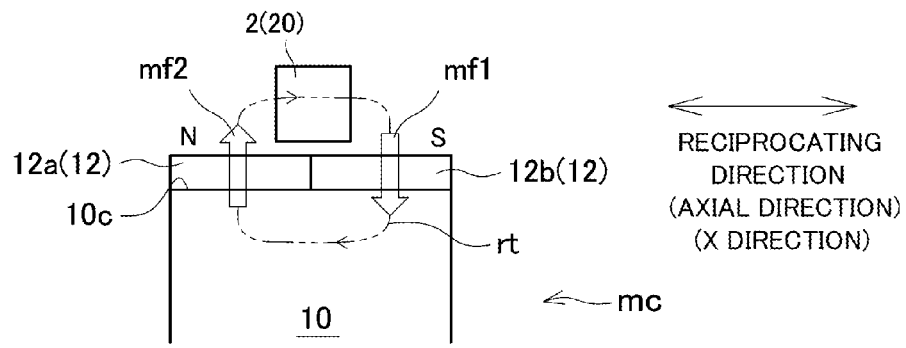
(b) ENERGIZED IN POSITIVE DIRECTION
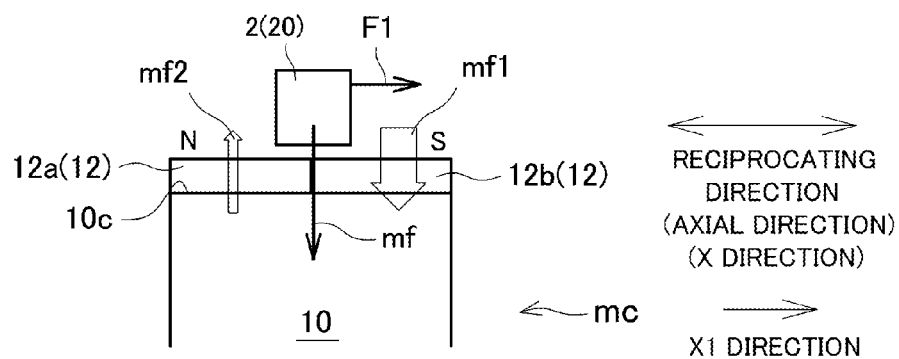
(c) ENERGIZED IN REVERSE DIRECTION
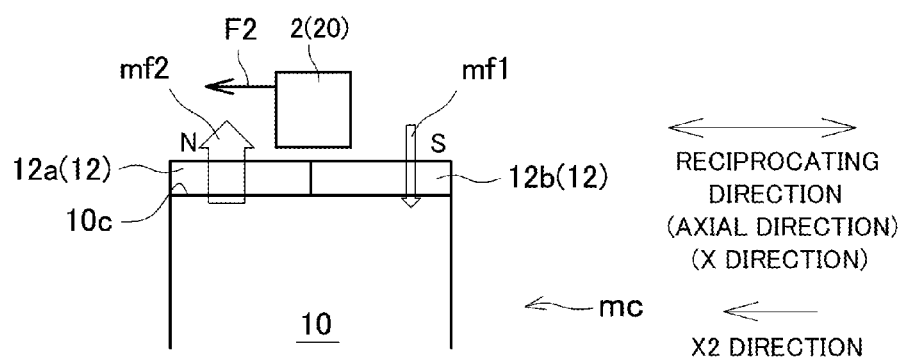

Fig. 4
(a) IF MAGNETIC FLUX DENSITY IS EQUAL AT BOTH SIDES IN RECIPROCATING DIRECTION
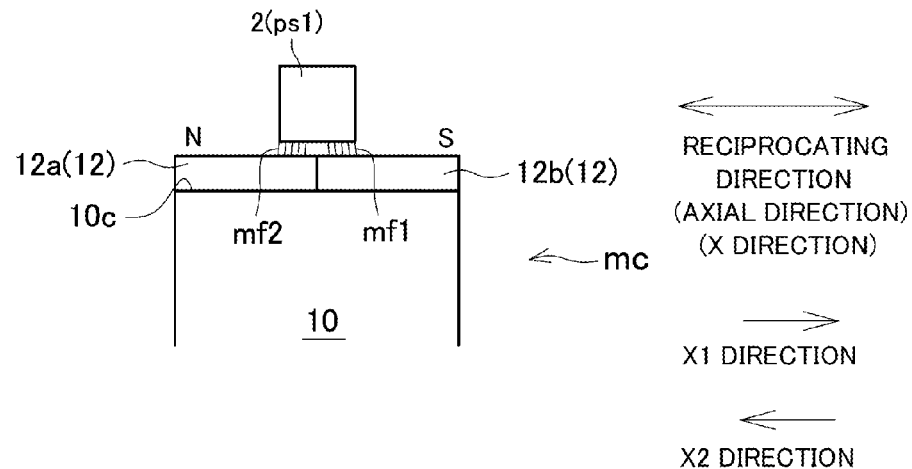
(b) IF MOVING ELEMENT IS DISPLACED TO X2 DIRECTION
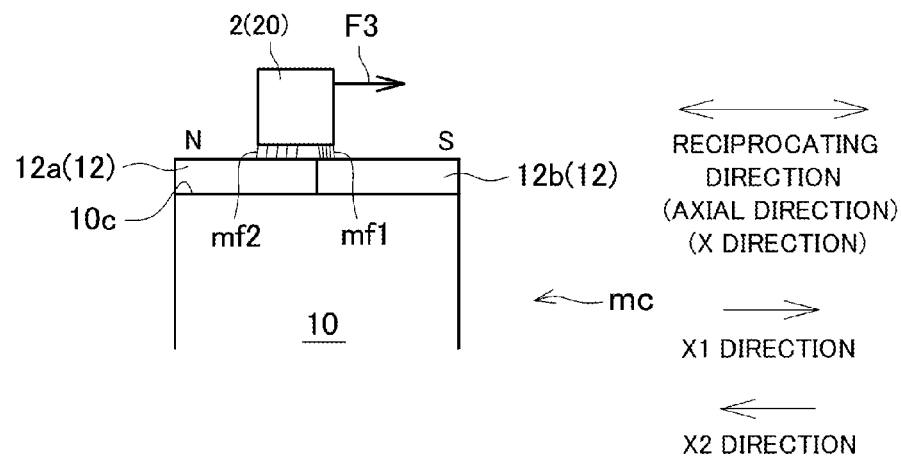

MOVABLE IRON CORE LINEAR ACTUATOR

TECHNICAL FIELD

The present invention relates to a movable iron core linear actuator which causes spring force of magnetic spring to act on a moving element which is reciprocating. More particularly, the present invention relates to a movable iron core linear actuator which implements a novel aspect of a spring characteristic.

BACKGROUND ART

A movable iron core linear actuators, such as a reciprocal motor, includes, as a main component, a magnetic circuit in which a moving element reciprocates when being energized as illustrated in, for example, Patent Document 1. The magnetic circuit includes an iron core constituting a moving element, a stator core including a facing portion which faces the iron core, a pair of permanent magnets disposed in a facing portion along the reciprocating direction and having inverted magnetic poles at their surfaces which face the iron core, and a coil wound around the stator core. A magnetic flux produced by energization of coil weakens a magnetic flux produced in a magnet situated in a necessary direction between the pair of permanent magnets, and strengthens a magnetic flux produced in the other magnet. Therefore, the moving element is made to reciprocate with respect to the stator core.

Further, the magnetic circuit causes the spring force of the magnetic spring, which is changed in accordance with a relative position of the moving element with respect to a stator core, to act on the moving element by the magnetic flux produced by the permanent magnets. When the coil is being energized, the spring force of the magnetic spring is superimposed on the magnetic driving force produced by the energization of the coil and is applied to the moving element.

PRIOR ART DOCUMENT

Patent Document

Patent Document 1: Japanese Patent Application Laid-open No. 2007-135351

SUMMARY OF THE INVENTION

Problems to be Solved by the Invention

However, although a magnetic spring characteristic which is a relationship between the relative position of a moving element with respect to a stator core and spring force of a magnetic spring is determined by magnetic flux distribution and a pole pitch, it has been difficult to change, for example, the magnetic flux distribution and adjust the magnetic spring characteristic in designing a related art linear actuator.

If the linear actuator is used as a power source of, for example, a piston pump, the linear actuator is typically made to reciprocate in a high efficient resonance state. There is a problem, however, that such reciprocation places load on a mechanical spring, such as a flat spring, whereby the life of the mechanical spring is shortened. In addition to that, since the magnetic spring is not adjustable and is fixed, it is necessary to adjust only the mechanical spring when obtaining a spring constant necessary for resonance movement. Therefore, there is a problem that the cost related to the mechanical spring is high.

If the linear actuator is used as a control element for, for example, position control and force control of a device, such as a positioning device, a vibration device and a linear servo motor, spring force of the magnetic spring becomes a factor to disturb control or a factor to lose thrust.

Further, in order to implement a novel aspect of a spring characteristic, such as reduction or elimination in the spring constant of the combination of the mechanical spring and the magnetic spring, a degree of freedom in design for the mechanical spring characteristic is required. However, since adjustment of magnetic spring characteristic is difficult as described above, the implementation of a novel aspect of a spring characteristic has been difficult.

The present invention has been made in view of these problems, and an object thereof is to provide a movable iron core linear actuator which implements a novel aspect of a spring characteristic, including of capability of adjustment of the magnetic spring characteristic, without any increase in manufacturing cost.

Means for Solving the Problem

The following measure has been devised as the present invention in order to solve the above-described problems.

That is, a movable iron core linear actuator of the present invention is a linear actuator of which moving element is made to reciprocate. The linear actuator includes a magnetic circuit which includes an iron core constituting the moving element, a stator core including a facing portion which faces the iron core, a pair of permanent magnets being disposed in the facing portion along the reciprocating direction and having inverted magnetic poles at their surfaces which face the iron core, and a coil wound around the stator core. A magnetic flux produced by energization of coil weakens a magnetic flux produced in a magnet situated in a necessary direction between the pair of permanent magnets, and strengthens a magnetic flux produced in the other magnet. Thus, the moving element is made to reciprocate. When the coil is being energized, the spring force of the magnetic spring which is changed by the magnetic flux produced by the permanent magnets in accordance with the relative position of the moving element with respect to the stator core is superimposed on the electromagnetic driving force produced by the energization of the coil and is applied to the moving element. A space portion having low magnetic permeability compared with the stator core is formed to constitute a magnetic spring adjustment portion which changes magnetic flux distribution, the space portion being formed in a state in which a part of the facing portion is removed in an area, which is the magnetic flux path, between a part of the facing portion of the stator core and the permanent magnet. By this magnetic spring adjustment portion, the magnetic spring characteristic which is the relationship between the relative position of the moving element with respect to the stator core and the spring force of the magnetic spring is changed compared with a case in which no space portion is formed.

As described above, the magnetic spring characteristic which is the relationship between the relative position of the moving element with respect to the stator core and the spring force of the magnetic spring may be adjusted to be a desired characteristic by only forming the space portion in a state in which the facing portion of the stator core has a cut-out. If the actuator is used as a power source, it is possible to adjust the magnetic spring characteristic so that the load placed on the mechanical spring is distributed to the magnetic spring and to prolong the life of the mechanical spring. It is further possible in obtaining a spring constant necessary for a resonance movement to reduce cost required for the magnetic spring by adjusting both the magnetic spring and the mechanical spring. If the actuator is used also as a control element, control accuracy and control efficiency may be improved by adjusting the magnetic spring characteristic to reduce the spring force of the magnetic spring so that the spring force of the magnetic spring does not become a factor to disturb control or a factor to lose thrust. Since the magnetic spring characteristic may be adjusted by the magnetic spring adjustment portion, it is possible to implement a novel aspect of a spring characteristic, such as reduction or elimination in the spring constant of the combination of the mechanical spring and the magnetic spring.

In order to improve control accuracy and control efficiency, it is desirable that the space portion is formed in a state in which both end portions of the facing portion in the axial direction which is the same direction as the movable direction of the moving element are unremoved and a portion placed between the end portions is removed.

In order to improve control accuracy and control efficiency without any change in the spring force of the magnetic spring at a boundary of the pair of permanent magnets, it is desirable that the space portion is formed to be symmetric about the boundary of the pair of permanent magnets.

In order to make adjustment of the magnetic spring characteristic be possible even in a configuration in which a plurality of permanent magnets are provided in pairs to increase the electromagnetic driving force to cause the moving element to reciprocate through energization, it is considered that a plurality permanent magnets are provided in pairs and the space portion is formed between at least one of the permanent magnets of each of the pairs and the facing portion which faces that permanent magnet.

In order to improve a degree of freedom in adjustment of the magnetic spring characteristic even in a case there is a restriction on the magnetic spring characteristic implemented in a single unit constituted by an iron core, a facing portion, a pair of permanent magnets and a magnetic spring adjustment portion. If the iron core, the facing portion, the pair of permanent magnets and the magnetic spring adjustment portion are formed as a single unit and such a unit are provided in a pair or a plurality of pairs, it is considered that each magnetic spring adjustment portion is formed such that the direction in which the spring force of one of the magnetic spring of each pair of units acts and the direction in which the spring force of the other of the magnetic spring acts are opposite from each other.

Effect of the Invention

In the present invention, as described above, since the magnetic spring characteristic can be adjusted by only forming a space portion in a state in which the facing portion of the stator core has a cut-out, if the actuator is used as a power source, it is possible to prolong the life of the mechanical spring and to reduce cost related to the mechanical spring by adjusting the spring force of the magnetic spring to a necessary value. If the actuator is used as a control element, control accuracy and control efficiency may be improved by reducing the spring force of the magnetic spring so that the spring force of the magnetic spring does not become a factor to disturb control or a factor to lose thrust. It is further possible to implement a novel aspect of a spring characteristic, such as reduction or elimination in the spring constant of the combination of the mechanical spring and the magnetic spring. It is therefore possible to provide a movable iron core linear actuator suitable for, for example, reduction in manufacturing cost, improvement in control accuracy and improvement in efficiency.

BRIEF DESCRIPTION OF THE DRAWINGS

FIG. 3 illustrate explanatory views related to a reciprocating operation of a moving element by energization of a coil.

FIG. 4 illustrates explanatory views related to spring force of a magnetic spring produced by a magnetic flux of a permanent magnet.

MODE FOR CARRYING OUT THE INVENTION

Hereinafter, an embodiment of the present invention will be described with reference to the drawings.

Figure 1:
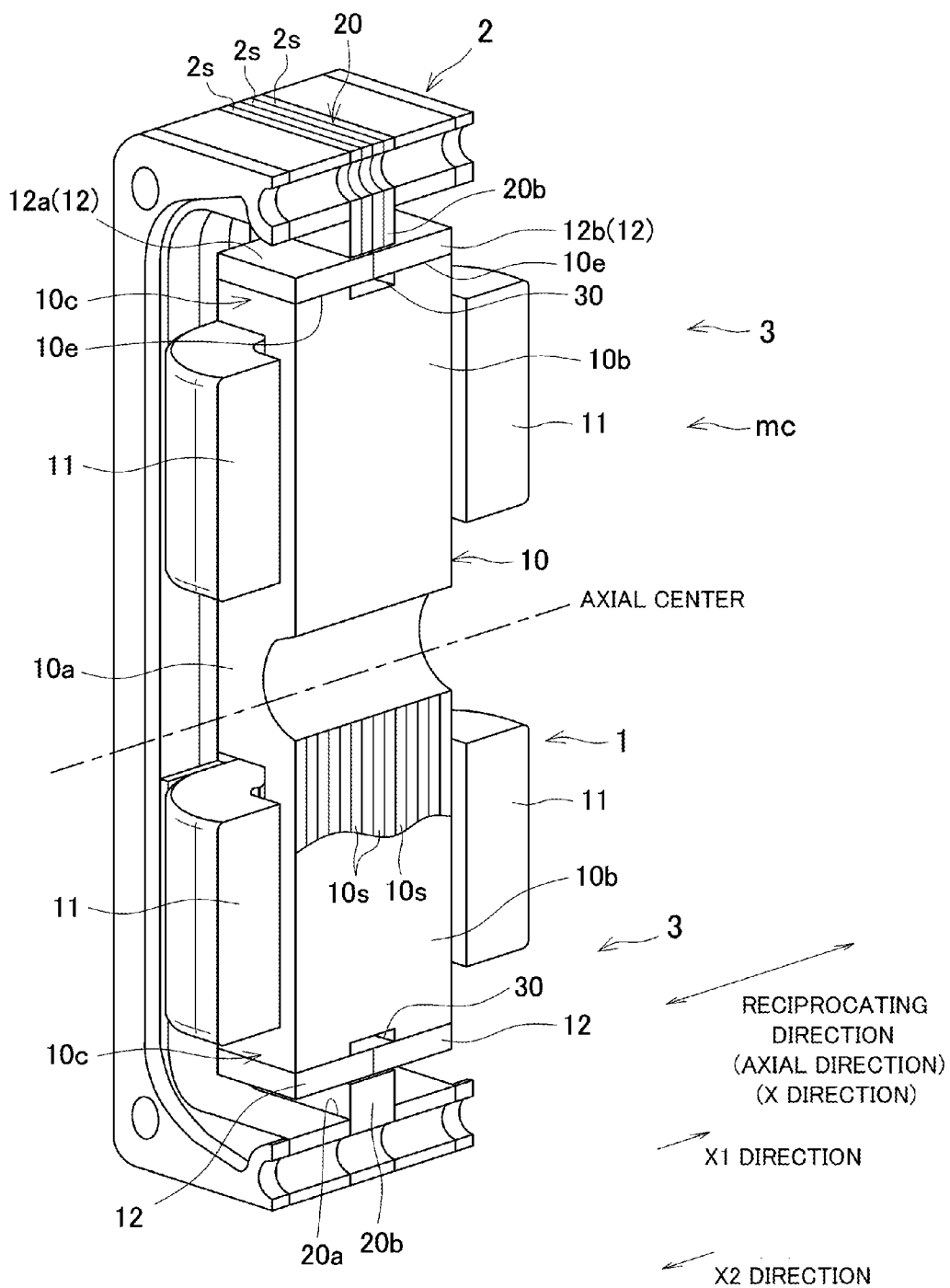
FIG. 1 is a partially fragmentary perspective view of a movable iron core linear actuator according to an embodiment of the present invention.
Figure 2:
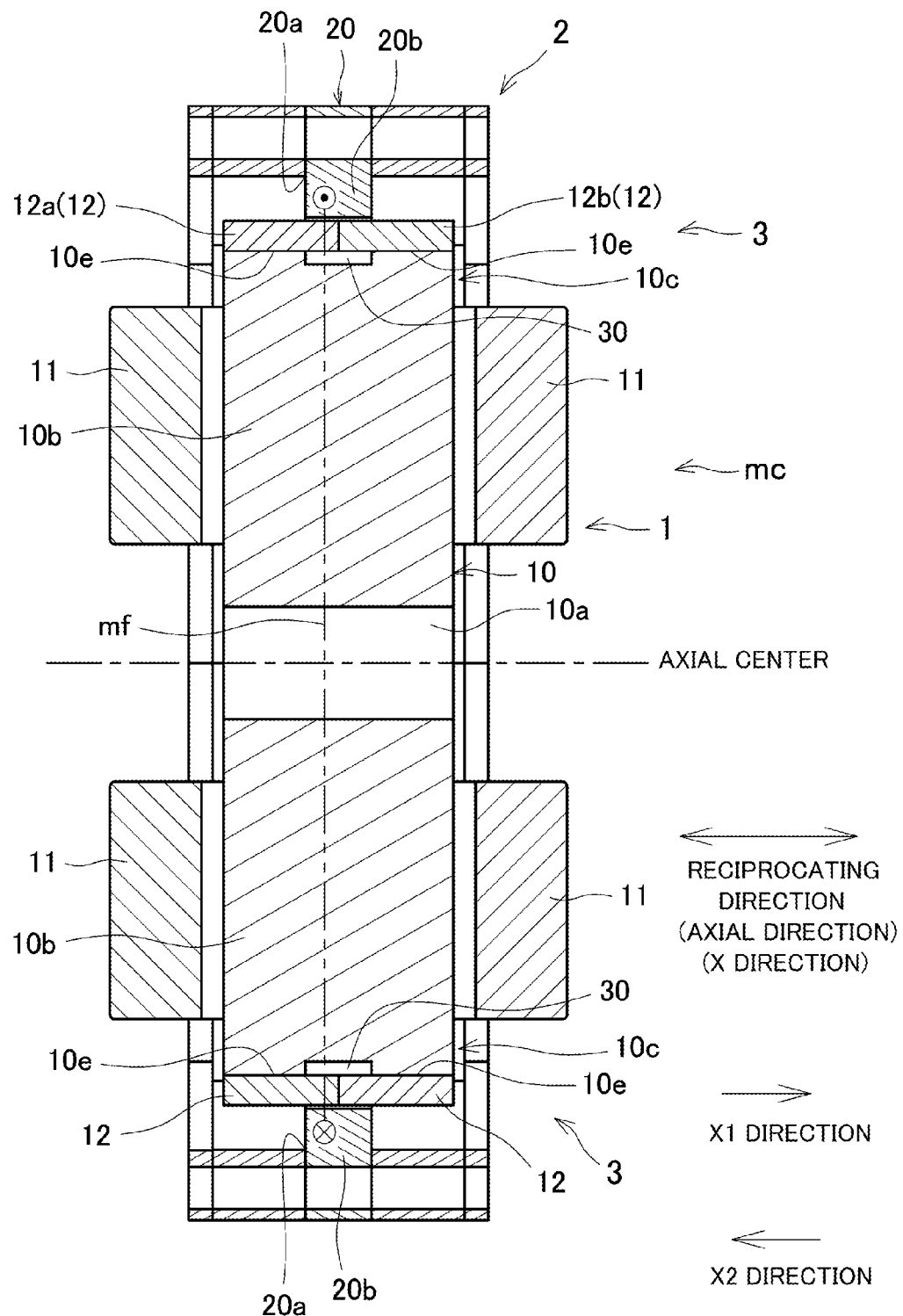
FIG. 2 is a longitudinal cross-sectional view of the linear actuator.

As illustrated in FIGS. 1 and 2, which are longitudinal cross-sectional view along an axial center, the movable iron core linear actuator of the present embodiment is an outer rotor type linear actuator in which a moving element 2 is disposed in a radial direction outside of a stator 1. The linear actuator includes the moving element 2 formed in a substantially cylindrical shape and movable in the axial direction (i.e., the X direction), the stator 1 disposed inside the moving element 2, and a magnetic circuit mc causing the moving element 2 to reciprocate along the axial direction (i.e., a reciprocating direction).

Note that the radial direction outside is the direction further away from the axial center, and the radial direction inside is the direction to approach to the axial center, and that the shape of the moving element or the stator is not limited to a column or a cylinder as illustrated in the drawings.

As illustrated in partial detail in FIG. 1, the moving element 2 includes, as a main component, an iron core 20 which is constituted by a plurality of moving element core boards 2s which are stacked and fixed into a substantially cylindrical shape. A pair of pole portions 20b and 20b are formed to protrude in the radial direction inside from an inner wall 20a of the iron core 20. The moving element 2 is supported by a not illustrated mechanical spring portion, such as a flat spring, at both end in the axial direction. Thus, the moving element 2 can reciprocate in the axial direction.

The stator 1 includes a stator core 10 in which a pair of salient pole portions 10b and 10b are formed to protrude in the radial direction outside from an axial central portion 10a, a coil 11 wound around the salient pole portions 10b and 10b of the stator core 10, and a pair of permanent magnets 12 (12a, 12b) disposed along the axial direction (i.e., the reciprocating direction) in a facing portion 10c (i.e., a facing surface) of the salient pole portion 10b at portions which face the pole portions 20b of the iron core 20, the pair of permanent magnets 12 having inverted magnetic poles at their surfaces which face the iron core 20. As illustrated in partial detail in FIG. 1, the stator core 10 is constituted by a plurality of stator core boards 10s which are stacked and fixed in the same manner as the iron core 20 which constitutes the moving element 2 described above.

The magnetic circuit mc includes the iron core 20, the stator core 10, the pair of permanent magnets 12 (12a, 12b) and the coil 11. When the coil 11 is energized, the moving element 2 is made to reciprocate. In the present embodiment, the movable iron core actuator is constituted with the components which constitute the moving element 2 among a plurality of components which constitute the magnetic circuit mc being used only as the iron core 20. In particular, when the coil 11 is not energized, as illustrated in FIG. 3(a), the pair of permanent magnets 12a and 12b forms a loop-shaped magnetic flux path rt which starts at one permanent magnet 12a, passes through the iron core 20, the other permanent magnet 12b and the stator core 10 and returns to one permanent magnet 12a. Thus, magnetic fluxes mf1 and mf2 which are opposite in direction are produced at both sides of the moving elements 2 in the reciprocating direction. In this case, when the coil 11 is energized in the positive direction, the magnetic flux mf is produced by the energization of the coil 11 as illustrated in FIGS. 2 and 3(b), among the two magnetic fluxes mf1 and mf2 produced by the permanent magnets 12, the magnetic flux mf1 which is in the same direction of the magnetic flux mf produced by the energization of the coil 11 becomes stronger and the other one, i.e., the magnetic flux mf2 becomes weaker. Then, electromagnetic driving force F1 is applied to the moving element 2 (i.e., the iron core 20) and the moving element 2 is moved in the direction in which the magnetic flux becomes stronger ("X1 direction"). If the coil 11 is energized in the reverse direction, as illustrated in FIG. 3(c), electromagnetic driving force F2 is applied to the reverse direction ("X2 direction") and the moving element 2 is moved in the X2 direction. That is, in the magnetic circuit mc, the magnetic flux mf produced by energization of the coil 11 weakens the magnetic flux mf2 (mf1) produced in the magnet 12a (12b) situated in a necessary direction between the pair of permanent magnets 12a and 12b, and strengthens the magnetic flux mf1 (mf2) produced in the other magnet 12b (12a). Therefore, the electromagnetic driving force F1 (F2) is applied to the moving element 2 so that the moving element 2 is made to reciprocate.

Figure 5:
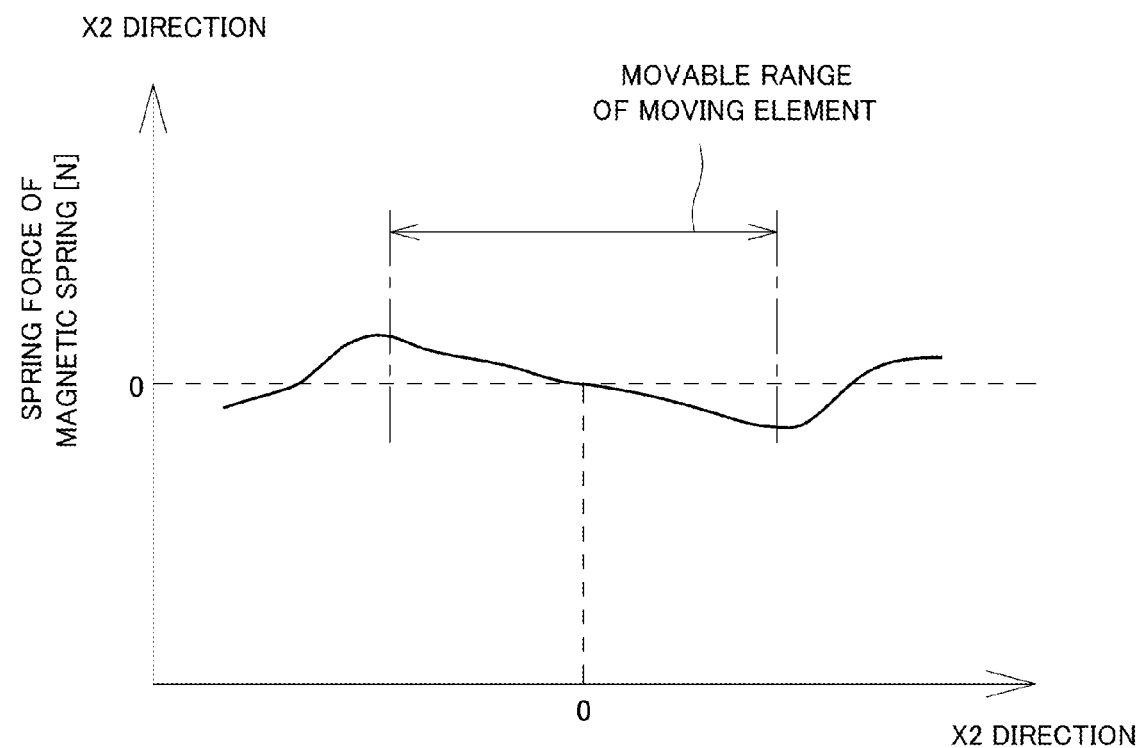
FIG. 5 is an explanatory view related to a magnetic spring characteristic which is a relationship between a relative position of the moving element with respect to a stator core and the spring force of the magnetic spring.

Further, the magnetic circuit mc causes the spring force of the magnetic spring, which is changed in accordance with the relative position of the moving element 2 to the stator core 10, to act on the moving element 2 by the magnetic flux produced by the permanent magnets 12. That is, when the moving element 2 is at a position ps1 at which the magnetic flux density of the moving element 2 at both sides in the reciprocating direction is equal as schematically illustrated by the intervals of lines in FIG. 4(a), as, for example, the moving element 2 is displaced in the X2 direction, the magnetic flux path on the side of the X2 direction becomes large while magnetic flux path on the side of the X1 direction becomes narrow as illustrated in FIG. 4(b). Therefore, the magnetic flux density on the side of the X2 direction becomes weaker while the magnetic flux density on the side of the X1 direction becomes stronger. In this case, spring force F3 of the magnetic spring acts on the moving element 2 so that the moving element 2 is moved to the position ps1 at which the magnetic flux density on both side in the reciprocating direction is equal. The strength and the direction of the spring force F3 of the magnetic spring is changed in accordance with the relative position of the moving element 2 with respect to the stator core 10 (i.e., a displaced amount from the center of the movable range of the moving element) as illustrated in FIG. 5. The spring force F3 is determined by, for example, the magnetic flux density, the magnetic flux distribution, and the pole pitch between the iron core and the permanent magnets. When the coil 11 is being energized, the spring force F3 of the magnetic spring by the permanent magnets 12 is superimposed on the magnetic driving force F1 and F2 which are produced by the energization of the coil 11 and is applied to the moving element 2.

However, although the magnetic spring characteristic which is the relationship between the spring force of the magnetic spring and the relative position of the moving element 2 with respect to the stator core 10 is determined by, for example, the magnetic flux distribution and the pole pitch, it is difficult to change, for example, the magnetic flux distribution and to adjust the magnetic spring characteristic in designing a linear actuator. It is especially difficult to improve the degree of freedom in adjustment of the magnetic spring characteristic without any increase in manufacturing cost.

Then, in the present embodiment, as illustrated in FIGS. 1 and 2, magnetic flux distribution is changed by forming a space portion 30 having low magnetic permeability compared with the stator core 10, the space portion 30 being formed in a state in which a part of the facing portion 10c is removed in an area, which is a magnetic flux path, between a part of the facing portion 10c of the stator core 10 and the permanent magnet 12. This space portion 30 is formed in a state in which both end portions 10e and 10e of the facing portion 10c in the axial direction which is the same direction as the movable direction of the moving element 2 are unremoved and a portion placed between the both end portions 10e and 10e is removed. The depth of the space portion 30 between the permanent magnets 12a and 12b and the facing portion 10c is set to be constant. Each of the end portions 10e and 10e is in contact with each of the pair of permanent magnets 12a and 12b, respectively. A boundary of the pair of permanent magnets 12a and 12b is the center of the movable range of the moving element and the space portion 30 is formed to be symmetric about the boundary of the pair of permanent magnets 12a and 12b.

When such a space portion 30 is formed, since both end portions 10e and 10e situated at both sides in the axial direction compared with the space portion 30 situated at the central portion in the axial direction have higher magnetic permeability, the magnetic flux is focused at both end portions 10e and 10e and is strengthened at both ends in the axial direction and weakened at the central portion in the axial direction placed between both end portions. With this magnetic flux distribution, since the force with which the moving element tries to remain at the central portion in the axial direction (i.e., the reciprocating direction) is reduced, an amount of change of the spring force of the magnetic spring with respect to the displacement of the moving element 2 (i.e., the slope) is reduced across the entire movable range of the moving element while the spring force at the center of the movable range of the moving element is kept as illustrated in FIG. 6.

Figure 6:
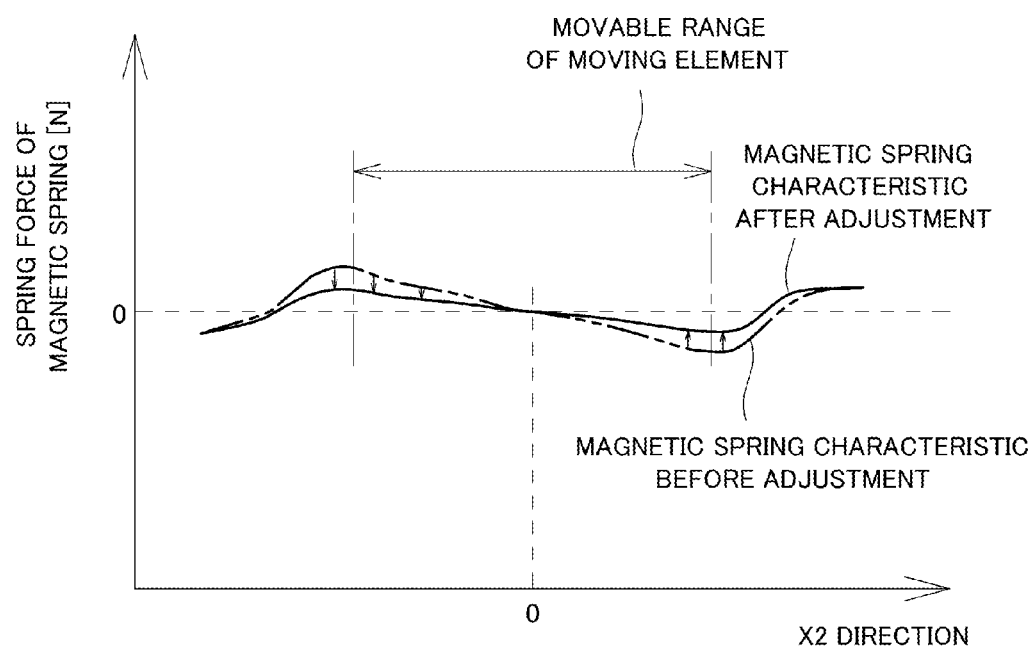
FIG. 6 is an explanatory view illustrating, in comparison, a magnetic spring characteristic in a case in which a space portion is formed and a case in which the space portion is not formed.

As described above, the space portion 30 is formed to constitute a magnetic spring adjustment portion 3 which changes the magnetic flux distribution and, by the magnetic spring adjustment portion 3, as illustrated in FIG. 6, the magnetic spring characteristic which is the relationship of the relative position of the moving element 2 with respect to the stator core 10 and the spring force of the magnetic spring is changed compared with a case in which no space portion 30 is provided (see FIG. 6). The magnetic spring characteristic can be adjusted by various changes in, for example, the dimension of the space portion 30 in the axial direction and in a direction which perpendicularly intersects the axial direction, the shape such as depth, the position to arrange, and the number to form. For example, it is considered that a bottom surface of the space portion 30 is formed to incline with respect to the axial center, or the dimension and the depth of the space portion 30 are changed along the axial center.

As described above, the movable iron core linear actuator of the present embodiment is a linear actuator of which moving element 2 is made to reciprocate. The linear actuator includes the magnetic circuit mc which includes the iron core 20 constituting the moving element 2, the stator core 10 including a facing portion 10c which faces the iron core 20, the pair of differently-polarized permanent magnets 12 (12a, 12b) being disposed in the facing portion 10c along the reciprocating direction and having inverted magnetic poles at their surfaces which face the iron core, and the coil 11 wound around the stator core 10. The magnetic circuit mc causes, via the magnetic flux mf produced by energization of the coil 11, the moving element 2 to reciprocate by weakening the magnetic flux mf2 (mf1) produced in the magnet 12a (12b) situated in a necessary direction between the pair of permanent magnets 12a and 12b, and strengthening the magnetic flux mf1 (mf2) produced in the other magnet 12b (12a). When the coil 11 is being energized, the spring force of the magnetic spring which is changed by the magnetic flux produced by the permanent magnets 12 in accordance with the relative position of the moving element 2 with respect to the stator core 10 is superimposed on the electromagnetic driving force F1 (F2) produced by the energization of the coil 11 and is applied to the moving element 2. A space portion 30 having low magnetic permeability compared with the stator core 10 is formed to constitute a magnetic spring adjustment portion 3 which changes magnetic flux distribution, the space portion 30 being formed in a state in which a part of the facing portion 10c is removed in an area, which is the magnetic flux path, between a part of the facing portion 10c of the stator core 10 and the permanent magnet 12. By this magnetic spring adjustment portion 3, the magnetic spring characteristic which is the relationship between the relative position of the moving element 2 with respect to the stator core 10 and the spring force of the magnetic spring is changed compared with a case in which no space portion 30 is formed.

As described above, the magnetic spring characteristic which is the relationship between the relative position of the moving element with respect to the stator core and the spring force of the magnetic spring may be adjusted to be a desired characteristic by only forming the space portion in a state in which the facing portion of the stator core has a cut-out. If the actuator is used as a power source, it is possible to adjust the magnetic spring characteristic so that the load placed on the mechanical spring is distributed to the magnetic spring and to prolong the life of the mechanical spring. It is further possible in obtaining a spring constant necessary for a resonance movement to reduce cost required for the magnetic spring by adjusting both the magnetic spring and the mechanical spring. If the actuator is used also as a control element, control accuracy and control efficiency may be improved by adjusting the magnetic spring characteristic to reduce the spring force of the magnetic spring so that the spring force of the magnetic spring does not become a factor to disturb control or a factor to lose thrust. Since the magnetic spring characteristic may be adjusted by the magnetic spring adjustment portion 3, it is possible to implement a novel aspect of a spring characteristic, such as reduction or elimination in the spring constant of the combination of the mechanical spring and the magnetic spring.

Further, in the present embodiment, the space portion 30 is formed in a state in which both end portions 10e and 10e of the facing portion 10c in the axial direction which is the same direction as the movable direction of the moving element 2 are unremoved and a portion placed between the both end portions 10e and 10e is removed. Therefore, since both end portions 10e and 10e situated at both sides in the axial direction compared with the space portion 30 situated at the central portion in the axial direction have higher magnetic permeability, the magnetic flux is focused at both end portions 10e and 10e and is strengthened at both ends in the axial direction and weakened at the central portion in the axial direction placed between both end portions. Since the force with which the moving element tries to remain at the central portion in the axial direction (i.e., the reciprocating direction) is reduced, an amount of change of the spring force of the magnetic spring with respect to the displacement of the moving element 2 (i.e., the slope illustrated in FIG. 6) is reduced. Therefore, movement control of the moving element becomes easy and control accuracy can be improved. Further, since the spring force of the magnetic spring is weakened, thrust loss caused by the spring force of the magnetic spring is reduced and efficiency can be improved.

Further, in the present embodiment, since the space portion 30 is formed to be symmetric about the boundary of the pair of permanent magnets 12a and 12b, the above-described effect of improvement in control accuracy and efficiency can be produced without any change in the spring force of the magnetic spring at the boundary of the permanent magnet.

Although an embodiment of the present invention has been described, specific configuration of each component is not limited to that of the foregoing embodiment.

Figure 7:
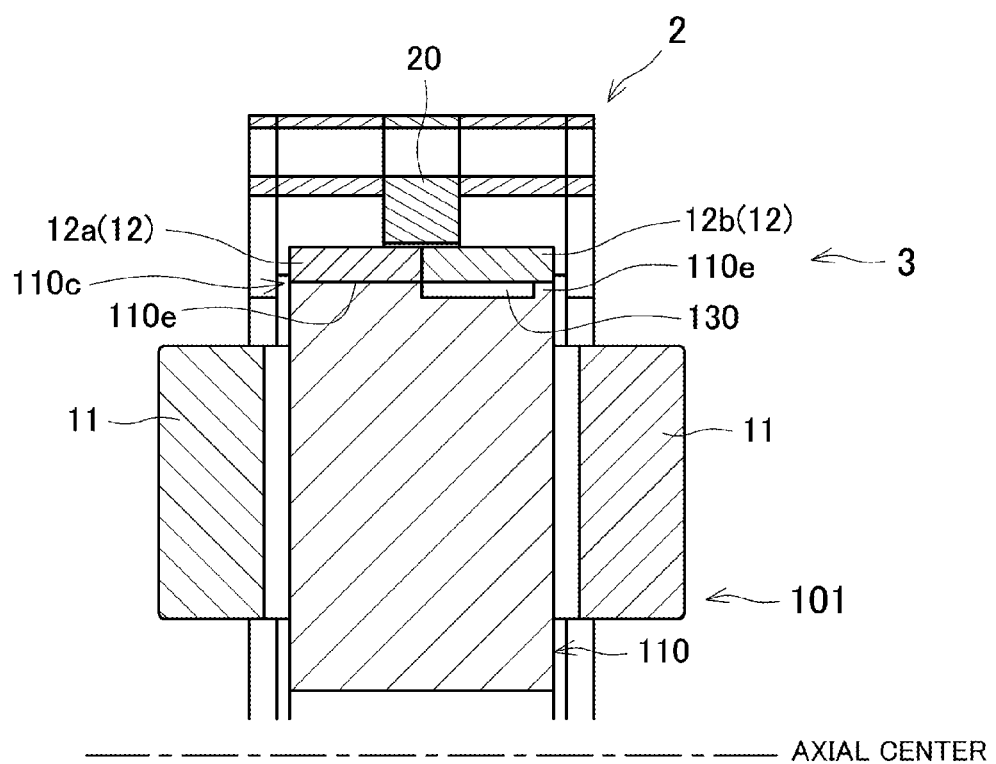
FIG. 7 is a longitudinal cross-sectional view illustrating a linear actuator related to another embodiment of the present invention.

For example, it is considered that, as illustrated in FIG. 7, a space portion 130 is formed only in a facing portion 110c which faces one permanent magnet 12b of a pair of permanent magnets 12a and 12b and the space portion 130 is placed between both end portions 110e and 110e in the axial direction of the facing portion 110c. With such a configuration, although the magnetic fluxes are unbalanced at both sides in the axial direction and the spring force of the magnetic spring are biased toward the X2 direction on the whole, an effect that an amount of change of the spring force of the magnetic spring with respect to the displacement of the moving element 2 (i.e., the slope illustrated in FIG. 6) is reduced is produced in the same manner as in the foregoing embodiment.

Figure 8:
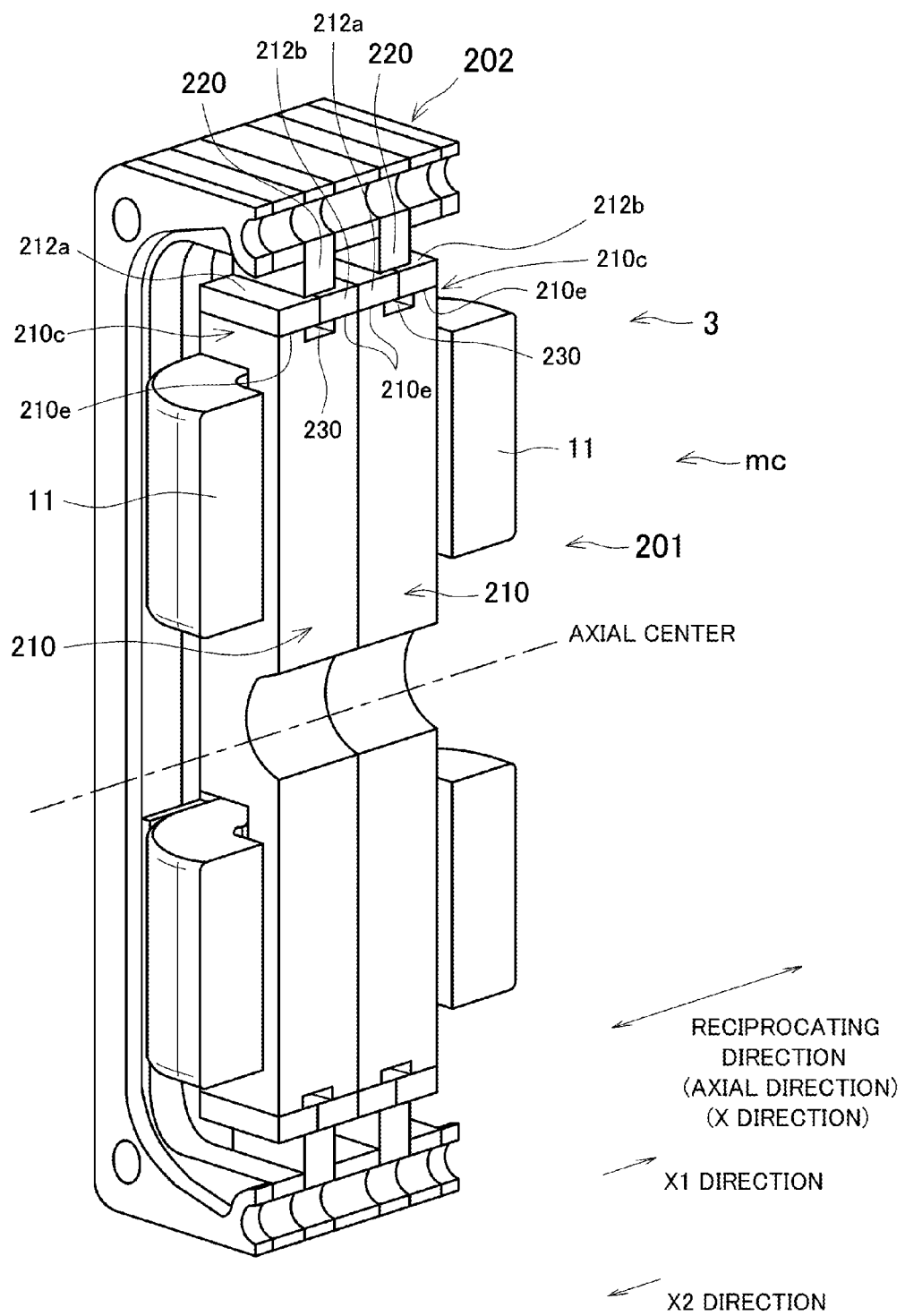
FIG. 8 is a partially fragmentary perspective view of a linear actuator related to an embodiment other than the foregoing embodiments of the present invention.
Figure 9:
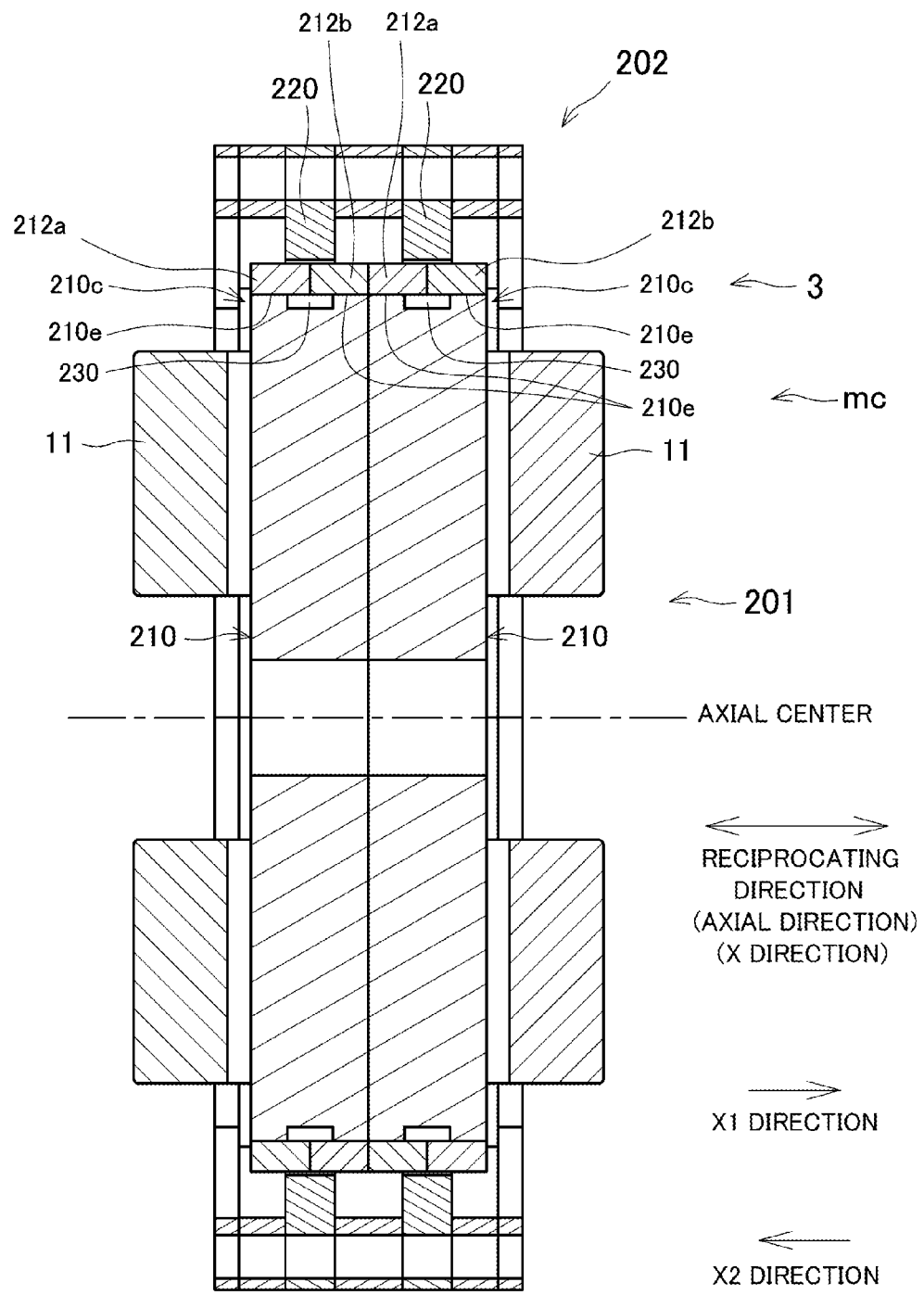
FIG. 9 is a longitudinal cross-sectional view illustrating the linear actuator corresponding to FIG. 8.

Further, as illustrated in FIGS. 8 and 9, an iron core 220 which constitutes a moving element 202, a facing portion 210c of a stator core 210 and a pair of permanent magnets 212a and 212b may be formed as a single unit. It is considered that a plurality of such units are provided along the axial direction so that the permanent magnets 212a and 212b are provided in pairs, and a space portion 230 may be formed between the pair of permanent magnets 212a and 212b which constitute each unit and facing portions 210c which face these permanent magnets 212a and 212b. The space portion 230 is formed to be symmetric about a boundary of the pair of permanent magnets 212a and 212b and is placed between a pair of ends 210e and 210e from both sides in the axial direction. With such a configuration, the magnetic spring characteristic may be adjusted so that the amount of change of the spring force of the magnetic spring with respect to the displacement of the moving element 202 (i.e., the slope illustrated in FIG. 6) is reduced even in a configuration in which a plurality of permanent magnets 212a and 212b are provided in pairs to increase the electromagnetic driving force which causes the moving element 202 to reciprocate through energization.

Figure 10:
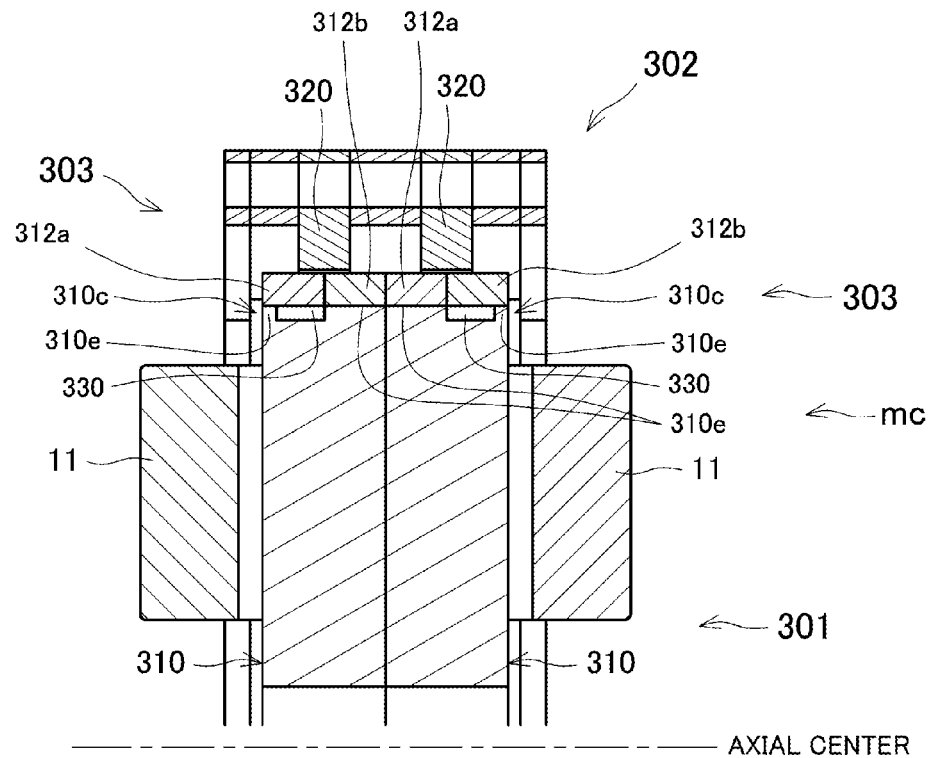
FIG. 10 is a longitudinal cross-sectional view illustrating a linear actuator related to an embodiment of the present invention other than those described above.

Further, as illustrated in FIG. 10, an iron core 320 which constitutes a moving element 302, a facing portion 310c of a stator core 310, a pair of permanent magnets 312a and 312b, and a magnetic spring adjustment portion 303 are formed as a single unit. A plurality of such units are provided along the axial direction so that the units are provided in a pair or a plurality of pairs. The space portion 330 which constitutes one of the pair of units is formed only in the facing portion 310c which faces the permanent magnet 312a on the side of the X2 direction and the space portion 330 which constitutes the other unit is formed only in the facing portion 310c which faces the permanent magnet 312b on the side of the X1 direction. That is, each magnetic spring adjustment portion 303 is formed such that the direction in which the spring force of one of the magnetic spring of each pair of units acts and the direction in which the spring force of the other of the magnetic spring acts are opposite from each other. With such a configuration, even in a case in which there is a restriction, such as limitation on reduction the spring force, on the magnetic spring characteristic implemented in a single unit, the magnetic spring characteristic on the whole of the magnetic spring characteristics of all the units may be set to a desired spring characteristic by setting the directions in which the spring force of each magnetic spring acts to be opposite to each other, and a degree of freedom in adjustment of the magnetic spring characteristic may be improved.

An unillustrated mechanical spring portion, such as a flat spring, which reciprocatably supports the moving element 2 described above is provided to make the urging force varying in accordance with the relative position of the moving element 2 with respect to the stator core 10 be applied to the moving element 2. A configuration is possible in which a space portion is provided so that the spring force of the magnetic spring acts in the direction opposite to the direction in which the urging force of the mechanical spring acts in the movable range of the moving element 2. With such a configuration, the urging force of the mechanical spring is weakened or eliminated by the spring force of the magnetic spring, and it is possible to provide a linear actuator having a novel spring characteristic in which the spring constant in combination of the mechanical spring and magnetic spring is reduced or eliminated.

In addition, although an outer rotor type linear actuator has been exemplified in the present embodiment, the present invention is applicable also to an inner rotor type linear actuator in which the moving element 2 is disposed in the radial direction inside of the stator 1 about the axial center.

Various other changes may be made without departing from the spirit and scope of the present invention.

Industrial Applicability

According to the present invention described in detail above, since the magnetic spring characteristic may be adjusted by only forming the space portion in a state in which the facing portion of the stator core has a cut-out, if the actuator is used as a power source, it is possible to prolong the life of the mechanical spring and to reduce cost related to the mechanical spring by adjusting the spring force of the magnetic spring to a necessary value. If the actuator is used as a control element, control accuracy and control efficiency may be improved by reducing the spring force of the magnetic spring so that the spring force of the magnetic spring does not become a factor to disturb control or a factor to lose thrust. It is further possible to implement a novel aspect of a spring characteristic, such as reduction or elimination in the spring constant of the combination of the mechanical spring and the magnetic spring. It is therefore possible to provide a movable iron core linear actuator suitable for, for example, reduction in manufacturing cost, improvement in control accuracy and improvement in efficiency.

The invention claimed is:

1. A movable iron core linear actuator of which moving element is made to reciprocate, the linear actuator comprising a magnetic circuit which includes:
    an iron core which constitutes the moving element;
    a stator core which includes a facing portion which faces the iron core;
    a pair of permanent magnets disposed in a facing portion along the reciprocating direction, the pair of permanent magnets having inverted magnetic poles at their surfaces which face the iron core; and
    a coil wound around the stator core,
    the magnetic circuit causing, via the magnetic flux produced by energization of the coil, the moving element to reciprocate by weakening the magnetic flux produced in the magnet situated in a necessary direction between the pair of permanent magnets, and strengthening the magnetic flux produced in the other magnet, and when the coil is being energized, spring force of a magnetic spring which varies in accordance with a relative position of the moving element with respect to the stator core being superimposed on electromagnetic driving force produced by the energization of the coil and applied to the moving element by the magnetic flux produced by the permanent magnets,
    wherein a space portion having low magnetic permeability compared with the stator core is formed to constitute a magnetic spring adjustment portion which changes magnetic flux distribution, the space portion being formed in a state in which a part of the facing portion is removed in an area, which is the magnetic flux path, between a part of the facing portion of the stator core and the permanent magnet and, by this magnetic spring adjustment portion, the magnetic spring characteristic which is the relationship between the relative position of the moving element with respect to the stator core and the spring force of the magnetic spring is changed compared with a case in which no space portion is formed.

2. The movable iron core linear actuator according to claim 1, wherein the space portion is formed in a state in which both end portions of the facing portion in the axial direction which is the same direction as the movable direction of the moving element are unremoved and a portion disposed between the end portions are removed.

3. The movable iron core linear actuator according to claim 2, wherein the space portion is formed to be symmetric about a boundary of the pair of permanent magnets.

4. The movable iron core linear actuator according to claim 3, wherein the permanent magnets are provided in a plurality of pairs and the space portion is formed between at least one of the permanent magnets of each of the pairs and the facing portion which faces that permanent magnet.

5. The movable iron core linear actuator according to claim 4, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

6. The movable iron core linear actuator according to claim 3, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

7. The movable iron core linear actuator according to claim 2, wherein the permanent magnets are provided in a plurality of pairs and the space portion is formed between at least one of the permanent magnets of each of the pairs and the facing portion which faces that permanent magnet.

8. The movable iron core linear actuator according to claim 7, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

9. The movable iron core linear actuator according to claim 2, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

10. The movable iron core linear actuator according to claim 1, wherein the space portion is formed to be symmetric about a boundary of the pair of permanent magnets.

11. The movable iron core linear actuator according to claim 10, wherein the permanent magnets are provided in a plurality of pairs and the space portion is formed between at least one of the permanent magnets of each of the pairs and the facing portion which faces that permanent magnet.

12. The movable iron core linear actuator according to claim 11, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

13. The movable iron core linear actuator according to claim 10, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

14. The movable iron core linear actuator according to claim 1, wherein the permanent magnets are provided in a plurality of pairs and the space portion is formed between at least one of the permanent magnets of each of the pairs and the facing portion which faces that permanent magnet.

15. The movable iron core linear actuator according to claim 14, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

16. The movable iron core linear actuator according to claim 1, wherein, if the iron core, the facing portion, the pair of permanent magnets and the magnetic spring adjustment portion are formed as a unit and such a unit are provided in a pair or a plurality of pairs, each magnetic spring adjustment portion is formed such that the direction in which the spring force of one of the magnetic spring of each pair of units acts and the direction in which the spring force of the other of the magnetic spring acts are opposite from each other.

* * * * *